United States Patent
Newstadt et al.

(10) Patent No.: US 10,437,988 B1
(45) Date of Patent: Oct. 8, 2019

(54) SMART COVER COMPONENTS FOR SECURITY POLICY ENFORCEMENT

(71) Applicant: SYMANTEC CORPORATION, Mountain View, CA (US)

(72) Inventors: Keith Newstadt, West Newton, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 202 days.

(21) Appl. No.: 15/698,396

(22) Filed: Sep. 7, 2017

(51) Int. Cl.
| | |
|---|---|
| *G06F 21/00* | (2013.01) |
| *H04L 29/06* | (2006.01) |
| *G06F 21/55* | (2013.01) |
| *G06F 21/52* | (2013.01) |
| *G06F 21/44* | (2013.01) |

(52) U.S. Cl.
CPC .............. *G06F 21/55* (2013.01); *G06F 21/52* (2013.01); *G06F 21/44* (2013.01); *G06F 2212/171* (2013.01); *G06F 2221/2149* (2013.01)

(58) Field of Classification Search
CPC .... G06F 21/55; G06F 21/52; G06F 2212/171; G06F 2221/2149; G06F 21/44
See application file for complete search history.

(56) References Cited

U.S. PATENT DOCUMENTS

| | | | | |
|---|---|---|---|---|
| 6,408,336 | B1* | 6/2002 | Schneider | H04L 63/0218 709/229 |
| 8,826,452 | B1* | 9/2014 | He | G06F 21/84 726/27 |
| 8,844,059 | B1* | 9/2014 | Manmohan | G06F 21/554 726/26 |
| 8,949,878 | B2 | 2/2015 | Dimitrova et al. | |
| 9,571,500 | B1* | 2/2017 | Chachar | H04L 63/10 |
| 2004/0088577 | A1* | 5/2004 | Render | G06F 21/552 726/25 |

(Continued)

OTHER PUBLICATIONS

"Adhesive Smart Film", Glass Apps, LLC, 2016, 12 pages, https://web.archive.org/web/20161226163254/https://www.glass-apps.com/products/smart-film/. [Retrieved Jan. 8, 2019].

(Continued)

*Primary Examiner* — Lisa C Lewis
(74) *Attorney, Agent, or Firm* — Meyertons Hood Kivlin Kowert and Goetzel PC; Rory D. Rankin

(57) ABSTRACT

Systems, apparatuses, methods, and computer readable mediums for utilizing smart components to monitor connected devices. In one embodiment, a system includes a computing device and a covering device which covers at least a portion of the computing device. The computing device includes one or more input/output (I/O) interfaces. The covering device may be a smart cover, a security screen protector, or other type of smart covering component. The covering device intercepts, via a first I/O interface, a signal generated by the computing device. The covering device analyzes the signal to determine if a security policy is being violated. The covering device performs a security action responsive to determining that a security policy is being violated. In one embodiment, the covering device covers a display of the computing device and the covering device utilizes photoresistor technology to read the display of the computing device on a pixel-by-pixel basis.

20 Claims, 13 Drawing Sheets

(56) References Cited

U.S. PATENT DOCUMENTS

| | | | | |
|---|---|---|---|---|
| 2004/0193910 A1* | 9/2004 | Moles | ............... | G06F 21/62 726/27 |
| 2007/0006316 A1* | 1/2007 | Veselova | ............ | G06F 21/6245 726/26 |
| 2009/0231252 A1* | 9/2009 | Maegawa | ............... | G06F 21/84 345/87 |
| 2014/0259184 A1* | 9/2014 | Hoyer | ............... | G06F 21/6245 726/28 |
| 2015/0100908 A1* | 4/2015 | Magistrado | ............ | G06F 21/84 715/766 |
| 2016/0300081 A1* | 10/2016 | Weksler | ............... | G06F 21/84 |
| 2018/0260587 A1* | 9/2018 | Peacock | ............... | G06F 9/4416 |
| 2018/0307871 A1* | 10/2018 | Rollins | ............... | G06F 21/84 |

OTHER PUBLICATIONS

Baig, Edward C., "An Internet of Things start-up helps parents control kids' screen time", USA Today, Feb. 2, 2016, 2 pages, https://www.usatoday.com/story/tech/columnist/baig/2016/02/02/first-look-startup-helps-parents-control-kids-screen-time/79698414/. [Retrieved Jan. 8, 2019].

Bullis, Kevin, "Light-Sensing Fibers for Transparent Cameras", MIT Technology Review, Jul. 28, 2006, 5 pages, https://www.technologyreview.com/s/406169/light-sensing-fibers-for-transparent-cameras/. [Retrieved Jan. 8, 2019].

"Exploring New Biometric Dimensions: LiveTouch®", Jenetric, 6 pages, https://web.archive.org/web/20161029002042/http://www.jenetric.com/technology.html. [Retrieved Jan. 8, 2019].

"Fire Kids Edition Tablet, 7" Display, 16 GB, Pink Kid-Proof Case (Previous Generation—5th)", Amazon, 9 pages, https://www.amazon.com/Fire-Tablet-Display-Wi-Fi-Kid-Proof/dp/B018Y226XO/ref=sr_1_cc_8?s=aps&ie=UTF8&qid=1488913078&sr=1-8-catcorr&keywords=Amazon+fire. [Retrieved Jan. 8, 2019].

"Tempered Glass with Smart + Buttons", Pure Gear, 2 pages, https://web.archive.org/web/20161211140339/https://www.puregearcom/shop-by-category/screen/tempered-glass-with-smart-buttons.html. [Retrieved Jan. 8, 2019].

Viejo, Aliso, "World's First Smartphone Case with Cell Signal Amplifier and Extended Battery", MJoose, Nov. 10, 2015, 3 pages, https://mjoose.com/press-release-worlds-first-smartphone-case-with-cell-signal-amplifier-and-extended-battery/. [Retrieved Jan. 8, 2019].

* cited by examiner

US 10,437,988 B1

SMART COVER COMPONENTS FOR SECURITY POLICY ENFORCEMENT

BACKGROUND

Technical Field

Embodiments described herein relate to computer devices and more particularly, to implementing security policy enforcement of computing devices.

Description of the Related Art

Modern computing and connected devices are becoming increasingly difficult to secure. Some devices prevent security software from being installed or prevent user applications from being loaded onto the devices. If a device (e.g., a mobile phone) does allow security software to be installed, the device may limit what the security software can do. For example, some devices utilize sandboxing, which prevents security software from having hooks into the operating system. Third party apps, integrated ecosystems, and lack of control and consistency in operating systems make these devices particularly prone to attack. Even attacks on traditional desktop and laptop computers are becoming more sophisticated, relying increasingly on social engineering to leverage the user's vulnerabilities.

SUMMARY

Systems, apparatuses, and methods for utilizing smart components to monitor connected devices are disclosed herein. In one embodiment, a system includes a computing device and a covering device which covers at least a portion of the computing device. The computing device includes one or more input/output (I/O) interfaces. The covering device may be a smart cover, a security screen protector, or other type of smart covering component. The covering device intercepts, via a first I/O interface, a signal generated by the computing device. The covering device analyzes the signal to determine if a security policy is being violated. The covering device performs a security action responsive to determining that a security policy is being violated.

In one embodiment, the covering device covers a display of the computing device and the covering device utilizes photoresistor technology to read the display of the computing device on a pixel-by-pixel basis. In one embodiment, the covering device includes a layer of smart film technology to obscure a first portion of the display of the computing device responsive to determining the first portion of the display includes content which violates a security policy. In one embodiment, the covering device registers as a first virtual I/O device with an operating system of the computing device. The covering device receives the signal via the first I/O interface while acting as the first virtual I/O device. In one embodiment, the first virtual I/O device is a secondary display device.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
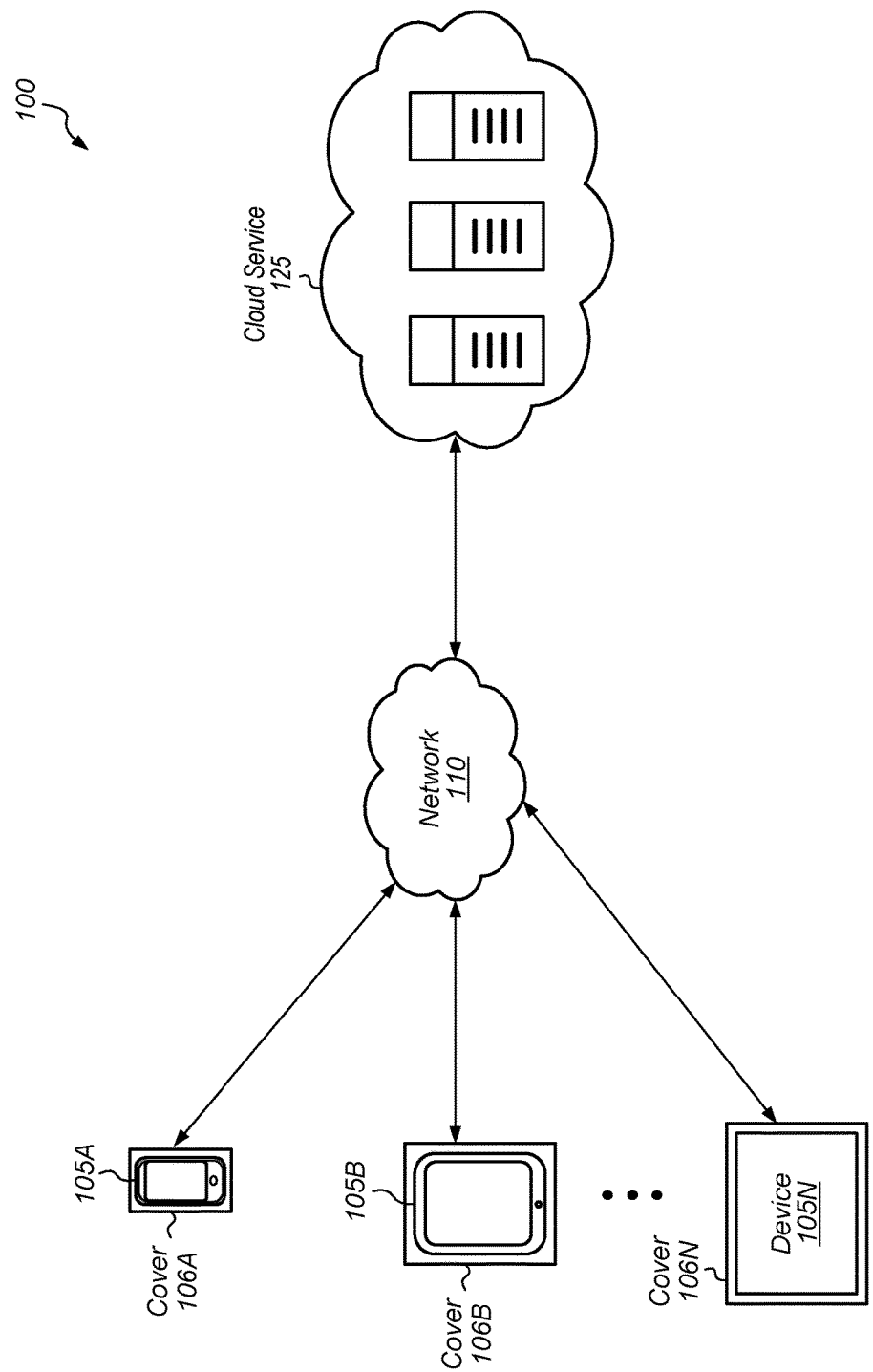
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a computing device . . . ." Such a claim does not foreclose the system from including additional components (e.g., a display unit, a storage unit).

"Configured To." Various units, circuits, or other components may be described or claimed as "configured to"

perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a system including a plurality of smart covers, the terms "first" and "second" smart covers can be used to refer to any two of the plurality of smart covers.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 is shown. System 100 includes devices 105A-N, network 110, and cloud service 125. It is noted that system 100 can include other components and/or the components can be arranged differently in other embodiments. Each device 105A-N includes a corresponding cover 106A-N which wraps at least a portion of the device. In some cases, a given cover 106 overlays a screen of the corresponding device 105. In other cases, a given cover 106 overlays other portions of the corresponding device 105 other than the screen.

Cloud service 125 includes any number and type of physical machines, such as computers and/or servers (e.g., database server, file server, application server), and any number and type of storage devices. The physical machines of cloud service 125 include any number and type of processors for executing instructions. Cloud service 125 is representative of any type of computer cluster or collection of multiple physical machines that are connected and work together. For example, in one embodiment, cloud 125 can represent a cloud computing provider with multiple servers. In one embodiment, cloud service 125 is configured to offer cloud computing resources to multiple organizations, companies, or individuals. Cloud computing is the delivery of computing as a service where shared resources, software, and information are provided to computers and other devices over a network. Cloud computing provides computation, software, data access, and data storage services. Many cloud computing infrastructures consist of services delivered through shared data centers and appear as a single point of access. Cloud service 125 can include a plurality of servers, including dynamically scalable or virtualized servers.

In one embodiment, cloud service 125 is configured to receive data from multiple covers 106A-N which are installed on devices 105A-N. The data from covers 106A-N is analyzed by cloud service 125 to determine if devices 105A-N are violating security or usage policies. Threat and/or security assessments are performed by cloud service 125 which can help protect devices 105A-N from viruses and/or prevent unauthorized actions by the users of devices 105A-N. For example, in one embodiment, a given cover 106 utilizes photoresistor technology to read what is on the screen of a given device 105. Cover 106 may analyze what is being displayed on the screen and/or cover 106 may send an indication of what is being displayed on the screen to cloud service 125 to perform additional analysis and to make additional threat assessments. If a link is being displayed on the screen of the given device 105, the link may be analyzed by cloud service 125 to determine if this link is associated with malware. If the link is deemed a threat, then the given cover 106 may block the link from being shown or prevent the user from clicking on the link by blocking the user's finger touch. Other actions may be performed to protect the given device 105.

In one embodiment, covers 106A-N connect to network 110 via wireless connections (e.g., WiFi, Bluetooth®). Network 110 is representative of any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 110.

Devices 105A-N are representative of any number and type of computing devices. Each device 105A-N may also include a smart cover 106A-N or security screen protector which wraps at least partially around the core device. In various embodiments, each of devices 105A-N may correspond to any of various types of computer systems or computing devices, including, but not limited to, a personal computer system, desktop personal computer (PC), laptop or notebook computer, laptop docking station, tablet, phone, smartphone, wearable device, personal digital assistant (PDA), smart thermostat, smart refrigerator, smart oven, smart toaster, smart coffee maker, television, digital video disc (DVD) player, video game console, streaming media player, or in general any type of computing system or device with a display. Generally speaking, devices 105A-N include various components including a display and one or more processors comprising one or more processor cores. Each processor core includes circuitry for executing instructions according to an instruction set architecture. The processor cores can access cache memory subsystems for data and computer program instructions. The cache subsystems can be coupled to a memory hierarchy comprising random access memory (RAM) and a storage device.

Figure 2:
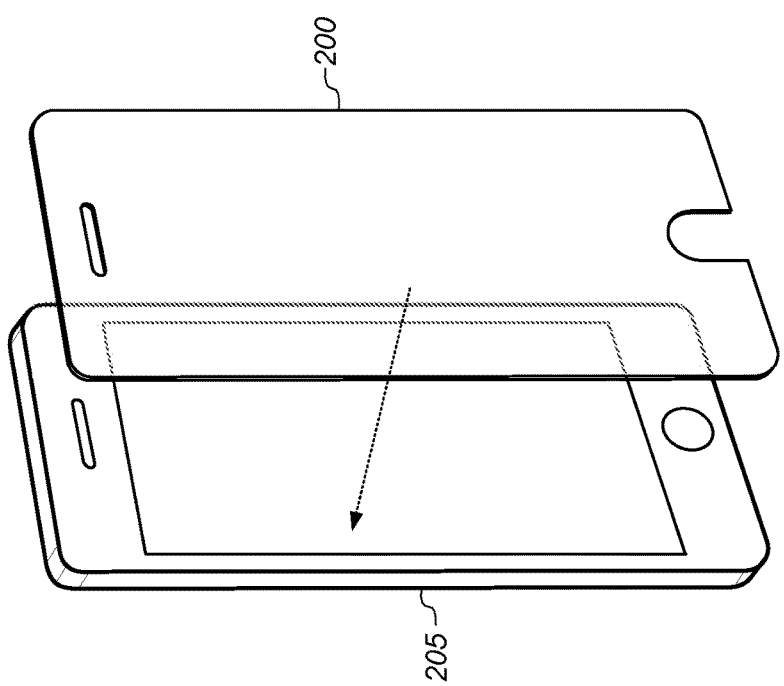
FIG. 2 is a diagram of one embodiment of a security screen protector covering a device.

Turning now to FIG. 2, a diagram of one embodiment of a security screen protector 200 covering a device 205 is shown. In one embodiment, security screen protector 200 is configured to cover the screen of device 205 to provide an additional layer of security or other functionality for device 205. While device 205 is shown as resembling a mobile phone, it should be understood that in other embodiments, other devices may be covered with a security screen protector 200. For example, in other embodiments, security screen protector 200 may be utilized to cover the screens of other types of devices, such as tablets, connected thermostats, televisions, smart toasters, smart refrigerators, smart ovens, wearable technology devices such as wrist watch devices and devices worn as glasses or a headset, and other connected appliances with displays. It is also noted that security screen protector 200 may be shaped differently in other embodiments.

In one embodiment, security screen protector 200 is configured to analyze images produced for display on the device 205. In some embodiments, protector 200 is configured to intercept, process, and proxy images produced by device 205. Additionally, security screen protector 200 may be configured to intercept, process, and proxy touch impulses generated by the user. In one embodiment, security screen protector 200 includes a layer of phototransistor technology to read the screen of device 205. Security screen protector 200 may also include a layer of smart film technology to obscure portions of the screen. Additionally, security screen protector 200 includes a touch detection layer to intercept screen touches and an electrical impulse layer to generate targeted electrical impulses to proxy screen touchs. In various embodiments, protector 200 may be configured to communicate with device 205 wirelessly.

Alternatively, protector 200 may be configured to connect to a physical port of the device 205 to facilitate communication. For example, in one embodiment, protector 200 may include ribbon type logic that connects to a port of the device and wraps around the device 205 such that the bulk of the logic of protector 200 is included on the back of the device and may, for example, adhere to the back of the device 205. These and other embodiments are possible and are contemplated in the various embodiments described herein.

In various embodiments, security screen protector 200 acts as a proxy interface between the user and device 205. In one embodiment, security screen protector 200 contains phototransistor technology to capture the contents of the screen of device 205 on a pixel-by-pixel (or other) basis. The contents of the screen may then be analyzed for content that is considered dangerous, violates a use policy, or otherwise meets some predetermined condition. For example, if the user of device 205 is a child, the parents of the child may set a use policy that only PG-rated movies may be viewed on device 205. If the child attempts to watch an R-rated movie on device 205, security screen protector 200 will detect the R-rated movie from an analysis of the screen contents and perform one or more security actions in response to detecting the violation of the use policy. For example, the security action may include obscuring portions of the screen, altering audio associated with the images, or disabling continued play of the movie.

When security screen protector 200 analyzes the content being displayed on the screen of device 205, security screen protector 200 may determine if any portions of the screen contain dangerous or unauthorized content. Depending on the embodiment, dangerous content may include pornographic content, a link to a web address associated with malware, other inappropriate or potentially malicious content, or content that violates a security policy or use policy. In one embodiment, security screen protector 200 includes smart film technology which allows security screen protector 200 to change from clear to opaque (e.g., by charging portions of the screen or otherwise). In one embodiment, security screen protector 200 may be separated into multiple portions, such that one or more portions of security screen protector 200 can be charged to make them opaque while the other portions are not charged to allow the user to see the screen underneath these other portions.

In one embodiment, security screen protector 200 intercepts the user's touches and chooses whether to propagate these touches to device 205. If security screen protector 200 decides to propagate a touch through to device 205, security screen protector 200 generates an electrical impulse to a specific location on the screen of device 205. Alternatively, security screen protector 200 may modify a touch to a different location of the screen. For example, security screen protector 200 may select a different keystroke or button selection than the one selected by the user. If security screen protector 200 decides to block a touch from the user, then nothing is propagated through to the actual screen of device 205.

For example, in one embodiment, device 205 is a thermostat. Security screen protector 200 may determine that the user is a child rather than a parent (e.g., based on login credentials), and so security screen protector 200 may restrict the child's ability to change the temperature on device 205. For example, the child may be allowed to change the temperature only in the range from 68 degrees Fahrenheit (F) to 75 degrees F. This range may be setup by a parent ahead of time. Accordingly, in this scenario, when the child touches on the security screen protector 200 to change the temperature, the touchs are propagated through to the thermostat as long as the touchs will keep the temperature within the authorized range. If the child touchs the up button when the temperature is already set to 75 degrees, then these touchs will not propagate through to the screen of device 205. Similarly, if the child touches the down button when the temperature is already set to 68, then these touchs will not propagate through to the screen of device 205. In other embodiments, for other types of devices, security screen protector 200 may propagate or block touchs on a case-by-case basis.

In one embodiment, security screen protector 200 is configured to add authentication to device 205. For example, when a user attempts to access device 205 by clicking on a button, an app, or other part of the user interface, security screen protector 200 generates a login screen asking the user for a username and password. Only after logging in will the user be able to access the user interface on the screen of device 205. If the user does not login, then security screen protector 200 may treat the user as a guest and only allow the user to perform actions consistent with a guest account.

Figure 3:
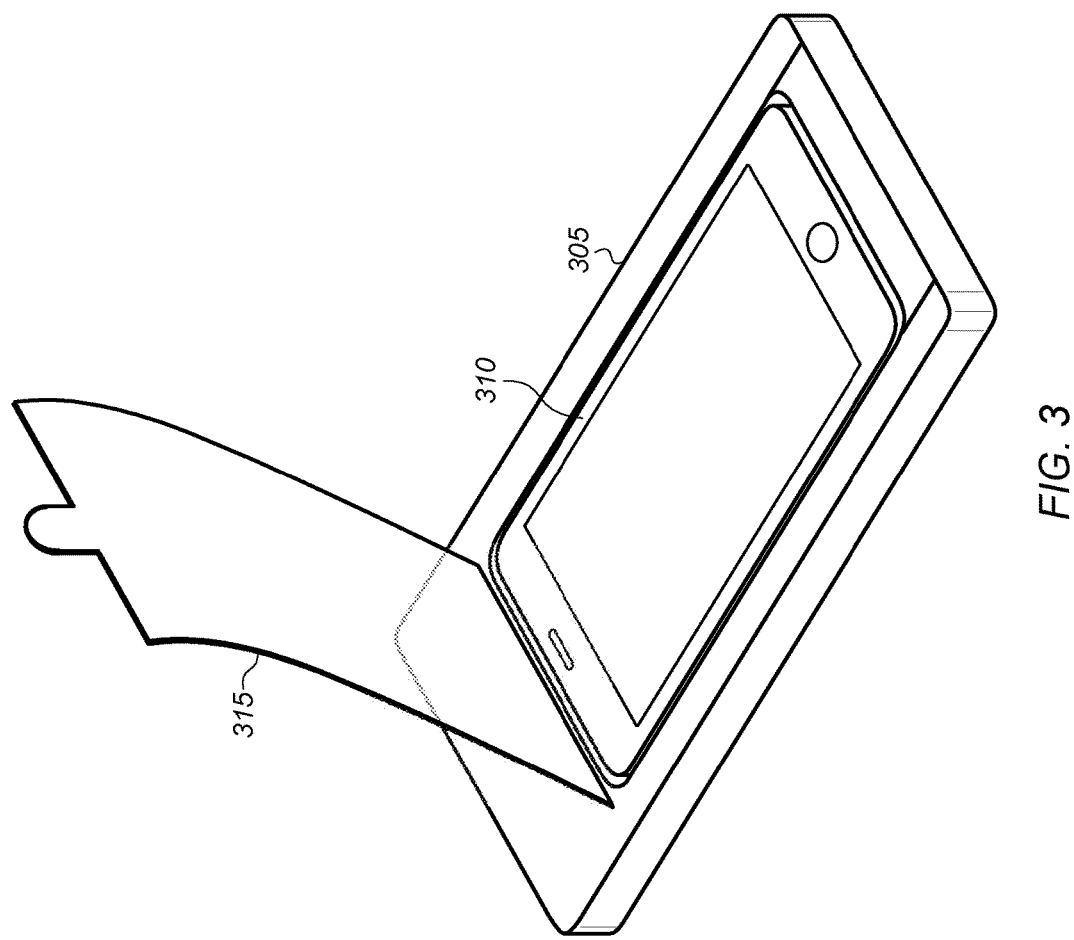
FIG. 3 is a diagram of one embodiment of a smart cover to implement security policy enforcement for a user device.

Referring now to FIG. 3, a diagram of one embodiment of a smart cover 305 to implement security policy enforcement for a user device 310 is shown. Smart cover 305 is representative of a security device that wraps around a user device 310 much like a cover. In one embodiment, smart cover 305 is attached to a set of extension batteries (not shown) to supply power to smart cover 305. In another embodiment, smart cover 305 pulls power from the battery or other power supply of the user device 310. In one embodiment, smart cover 305 includes a retractable flap 315 over the screen of user device 310. In other embodiments, smart cover 305 does not overlay any portion of the screen of user device 310.

In one embodiment, smart cover 305 acts as a physical proxy for the external ports (e.g., phone jack, universal serial bus (USB) port, firewire port) of user device 310. In another embodiment, smart cover 305 monitors radio communication (e.g., WiFi, Bluetooth, near-field communication (NFC)) transmitted or received by user device 310. In a further embodiment, smart cover 305 may register as an external keyboard (to either substitute for the keyboard of user device 310 or to act in parallel), external mouse, virtual secondary display (to get a copy of what is shown on the device display), or smart cover 305 may register as other input/output (I/O) devices. It should be understood that smart cover 305 may register as multiple different I/O devices in a single embodiment.

In one embodiment, smart cover 305 connects to a dock connector of user device 310 and registers as a secondary virtual display and analyzes, parses, and classifies what is being driven to the main display of user device 310. For example, smart cover 305 detects signals sent, via the dock connector, to smart cover 305 acting as a secondary display, files being opened, applications being downloaded and started, Uniform Resource Locators (URLs) visited, text being typed by the user on the keyboard, etc. In one embodiment, smart cover 305, acting as the virtual secondary display, utilizes optical character recognition (OCR) to identify text on the screen. In another embodiment, smart cover 305 utilizes content classifiers to identify what is shown on the screen. For example, smart cover 305 utilizes a content classifier to determine if there is pornographic content present on the screen. Then, if pornographic content is detected, smart cover 305 blocks or otherwise obscures this content.

In one embodiment, smart cover 305 acts as an external keyboard or mouse (either real or virtual) to intercept user input (e.g., what the user is typing) or uses virtual navigation signals from the keyboard or mouse to enforce the security policy or to obtain more information to be collected via the secondary display. For example, smart cover 305 may simulate the user clocking "close" to exit a workflow which violates the security policy. Alternatively, smart cover 305 may simulate the user scrolling through the browser address bar to collect (via the secondary display) the entire URL to which the user is navigating. Additionally, smart cover 305 may intercept voice communication (via a phone jack), network communications (by acting as a WiFi hotspot), and/or other communications. When an action is detected and an analysis of the action determines that the action is considered dangerous, a security policy may be applied. Various types of security actions may be performed by smart cover 305, depending on the embodiment, including notifying the user via vibration, sound, color change, or push notification to the user device, alerting an administrator, locking the user device, or other types of notifications.

In one embodiment, smart cover 305 may analyze the network stream and detect that the user is navigating to a public share (e.g., Dropbox®). By parsing the display content, smart cover 305 may detect that the user is about to upload a file from the company share to their personal account which may be a violation of the company policy. At this point, smart cover 305 may jam the WiFi signal, reset the connection, raise an alert, ask the user to provide an explanation for this action, and/or perform other security actions. In some cases, smart cover 305 may continuously monitor if it is still connected to device 310 (e.g., for parental control purposes) and issue an alert if the connection is broken.

It is noted that the example of smart cover 305 shown in FIG. 3 is indicative of one embodiment. In other embodiments, the appearance of smart cover 305 may vary. For example, in other embodiments, the corners or other surfaces may be curved, smart cover 305 may be shaped differently, smart cover 305 may fit differently around the device 310, and/or smart cover 305 may be designed differently.

Figure 4:
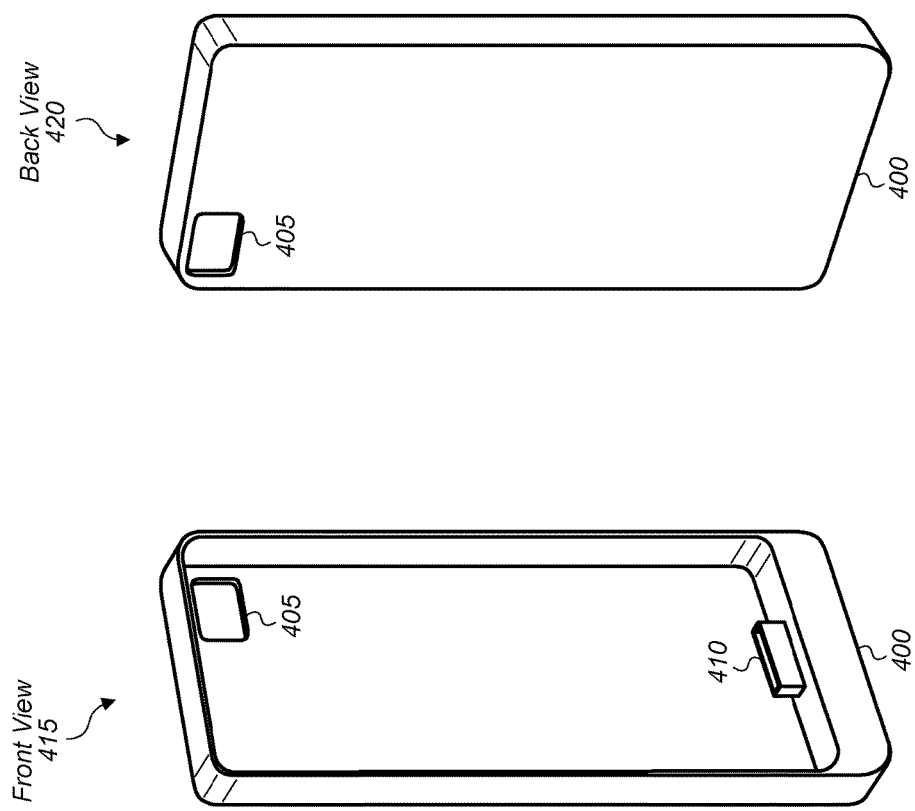
FIG. 4 is a diagram of another embodiment of a smart cover.

Turning now to FIG. 4, a diagram of another embodiment of a smart cover 400 is shown. Smart cover 400 illustrates another example of smart cover that may be utilized to protect a physical device. The physical device may be any type of device (e.g., smartphone, smart thermostat, TV, tablet, connected appliance). Smart cover 400 may have similar functionality as smart cover 305 (of FIG. 4) but with a different appearance and without a cover over the screen of the physical device. It is noted that other alternative smart covers with different appearances are possible and are contemplated.

Front view 415 of smart cover 400 is shown on the left side of FIG. 4. Smart cover 400 includes a male dock connector 410 to connect to the female dock connector (e.g., USB port, FireWire port, Lightning port) of the actual user device. By connecting to the dock connector of the user device, smart cover 400 is able to register with the user device as a secondary display, as a virtual keyboard, as a virtual mouse, or as other types of I/O devices. Smart cover 400 may also include a camera hole 405 to allow the camera of the user device to function as expected. In one embodiment, smart cover 400 includes smart film technology covering camera hole 405 which allows smart cover 400 to change from clear to opaque by charging the smart film over camera hole 405. For example, if smart cover 400 detects malware or a security violation on the user device, then smart cover 400 may change from clear to opaque to prevent the malware from using the camera to capture images or video unbeknownst to the user. For a device with front and back cameras, smart cover 400 includes smart film covering both the front and back cameras. If malware is detected on the device, then smart cover 400 charges the smart film covering the front and back cameras to cause the smart film to change from clear to opaque. This can help protect the privacy of the user and prevent malware from taking over the user device and capturing private images or video of the user.

Back view 420 of smart cover 400 is shown on the right side of FIG. 4. In one embodiment, smart cover 400 covers the entirety of the back of the user device with smart film covering the camera hole 405. It is noted that in other embodiments, smart cover 400 may be include other connections and/or may be structured differently than is shown in FIG. 4. Although not shown in FIG. 4, smart cover 400 may also include connections to other I/O ports on the user device, such as a microphone jack, headphone jack, etc. Smart cover 400 may monitor if it is still connected to the user device (e.g., for parental control purposes) and issue an alert if the connection is broken.

Figure 5:
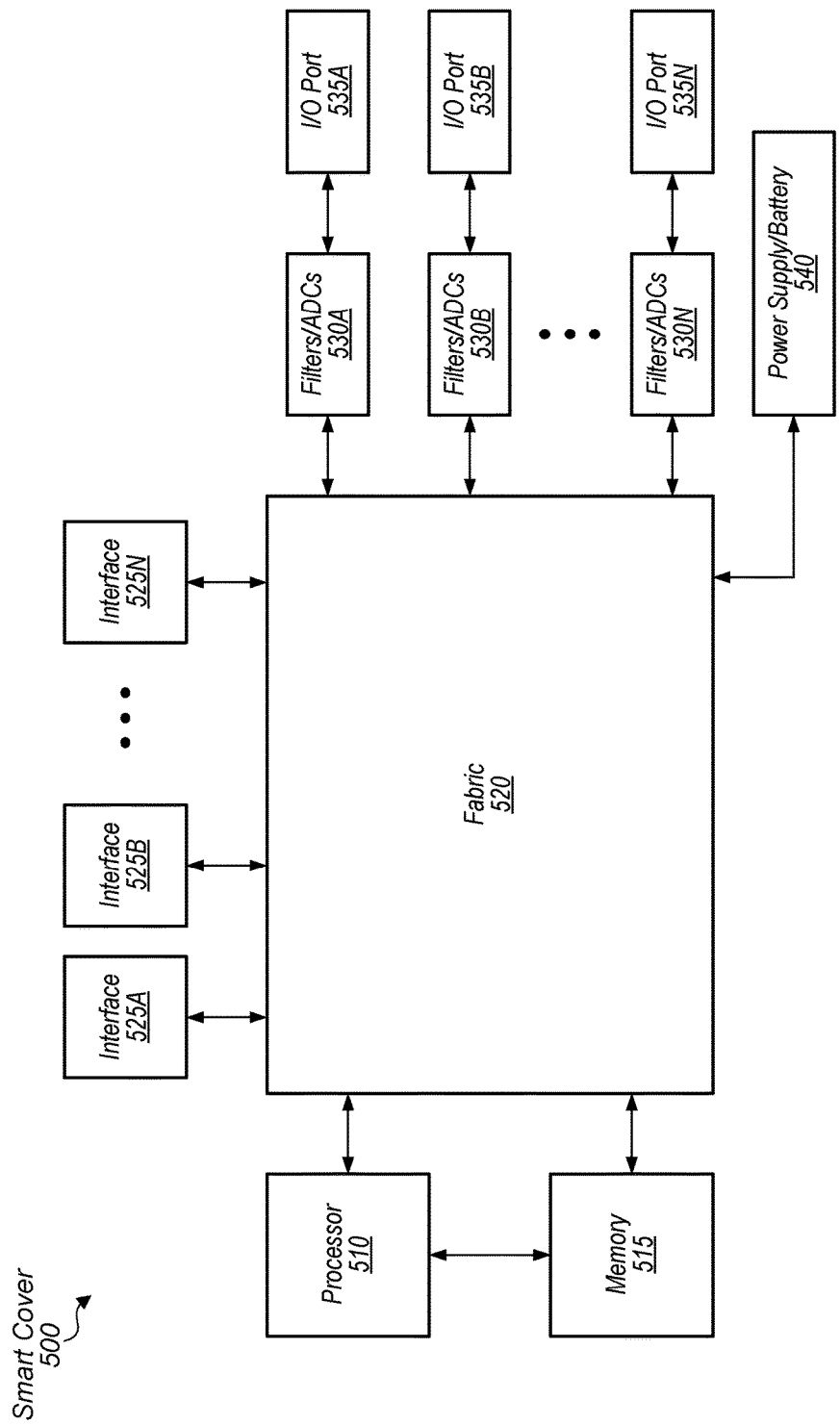
FIG. 5 is a block diagram of one embodiment of internal circuitry of a smart cover.

Referring now to FIG. 5, a block diagram of one embodiment of internal circuitry of a smart cover 500 is shown. In one embodiment, the internal circuitry of smart cover 500 includes processor 510, memory 515, fabric 520, interfaces 525A-N, filters/analog to digital converters (ADCs) 530A-N, input/output (I/O) ports 535A-N, and power supply/battery 540. In other embodiments, smart cover 500 may include other components and/or omit one or more of the components shown in FIG. 5. In one embodiment, smart cover 305 (of FIG. 3) includes the circuitry of smart cover 500 shown in FIG. 5. In another embodiment, smart cover 400 (of FIG. 4) includes the circuitry of smart cover 500 shown in FIG. 5.

Processor 510 is representative of any type and number of processing units for executing instructions to interface with and/or control the operation of the other internal circuitry. Memory 515 is representative of any type and number of memory devices for storing data and instructions. Memory 515 may include volatile and/or non-volatile storage devices. In one embodiment, the program instructions being executed by processor 510 are stored in memory 515. Fabric 520 is representative of any number and type of buses, interfaces, interconnects, and/or other structures for interconnecting the various components of smart cover internal circuitry 500.

Interfaces 525A-N are representative of any number and type of interfaces for communicating with the device being covered and/or other devices or networks. For example, in one embodiment, interface 525A includes WiFi circuitry for communicating with the user device being covered by the smart cover and for communicating with a WiFi network. In this embodiment, interface 525A announces itself as a WiFi hotspot, and the user device will then connect wirelessly to interface 525A and send and receive data wirelessly to and from interface 525A. In another embodiment, interface 525A is a WiFi adapter for receiving data from one of I/O ports 535A-N and then transmitting the data to a WiFi hotspot. In this embodiment, interface 525A acting as a WiFi adapter also receives wireless data from the WiFi hotspot and then transmits the data to a corresponding I/O port 535 to provide the data to the user device.

In one embodiment, interface 525B is a Bluetooth adapter or Bluetooth interface. In this embodiment, interface 525B communicates with the user device via a Bluetooth connection and then interface 525B communicates with an external Bluetooth device. In this way, interface 525B intercepts all of the Bluetooth communications which are sent or received by the user device. In another embodiment, interface 525B announces itself as a Bluetooth adapter to the operating system of the user device. In this embodiment, interface 525B utilizes one of I/O ports 535A-N as a physical connection to the user device to install itself as a Bluetooth adapter for the user device. This enables Bluetooth communication of the user device to pass through interface 525B.

In one embodiment, interface 525N is a radio interface which acts a virtual cell tower. In this embodiment, interface 525N receives all of the cellular traffic of the user device by presenting itself as a virtual cell tower to the user device. Interface 525N is configured to implement the protocol for acting as a cell tower, and then the user device will route calls and other communications (e.g., text messages) through interface 525N as though interface 525N is a cell tower. Then, interface 525N can transfer the calls and other communications to an actual, physical cell tower. In this way, interface 525N may intercept all of the cellular traffic of the user device.

For any of the above embodiments, the data that is received can be filtered, sampled, and/or processed (e.g., by filters/ADCs 530A-N) and then provided to processor 510 for further analysis. Processor 510 is configured to determine if any of the data being transmitted and/or received indicates that the user device is performing any prohibited activities. If any of the activities of the user device violates a security policy, then processor 510 is configured to initiate a security action, utilizing the same interface 525 on which the communication was detected, or utilizing a different interface 525 or an I/O port 535A-N to alert the user.

Processor 510 may also cause one or more security actions such as disconnecting the device from the Internet or disconnecting any connections to other devices if an unauthorized activity is detected.

In one embodiment, I/O port 535A is connected to a dock connector (e.g., USB port, FireWire port, Lightning port) of the user device. In this embodiment, smart cover 500 generates signals to register itself as a secondary device connected to the user device. For example, smart cover 500 may register with the operating system of the user device to act as a secondary display, a secondary keyboard, a secondary mouse, a secondary microphone, a secondary speaker, or other secondary device. In some embodiments, smart cover 500 may register itself as multiple separate devices on a single dock connector by utilizing different addresses for the different devices being emulated.

When smart cover 500 is acting as a secondary display, the user device sends data to smart cover 500 (via I/O port 535A) which is intended to be displayed on the secondary display. This data may be filtered and/or sampled by filters/ADCs 530A, and then the data is routed to processor 510 via fabric 520. Processor 510 is configured to determine if any security or content policies are being violated based on the data being displayed.

For example, if smart cover 500 detects, based on the content of the display, that the user navigating to a webpage which is known to be malicious, smart cover 500 can generate an alert and/or prevent the user from navigating to the webpage. To prevent the user from navigating to the webpage, smart cover 500 may generate a mouse click (as a secondary mouse), delete the text being entered on the web browser (as a secondary keyboard), or prevent the user device from accessing the webpage (by blocking access to the Internet as a WiFi hotspot or WiFi adapter).

In one embodiment, I/O port 535B is physically coupled to a headphone jack of the user device. The signals captured on I/O port 535B are filtered and sampled by filters/ADCs 530B and then provided to processor 510 for analysis. If processor 510 determines that the audio data captured from I/O port 535B indicates that a security policy is being violated, processor 510 can initiate one or more security actions. In other embodiments, I/O port 535N may be coupled to a speaker of the user device, to a memory card slot of the user device, or to any of various other interfaces of the user device. It is noted that the logic shown in smart cover 500 is indicative of one embodiment. It should be understood that smart cover 500 can include other components and/or be arranged differently in other embodiments.

Figure 6:
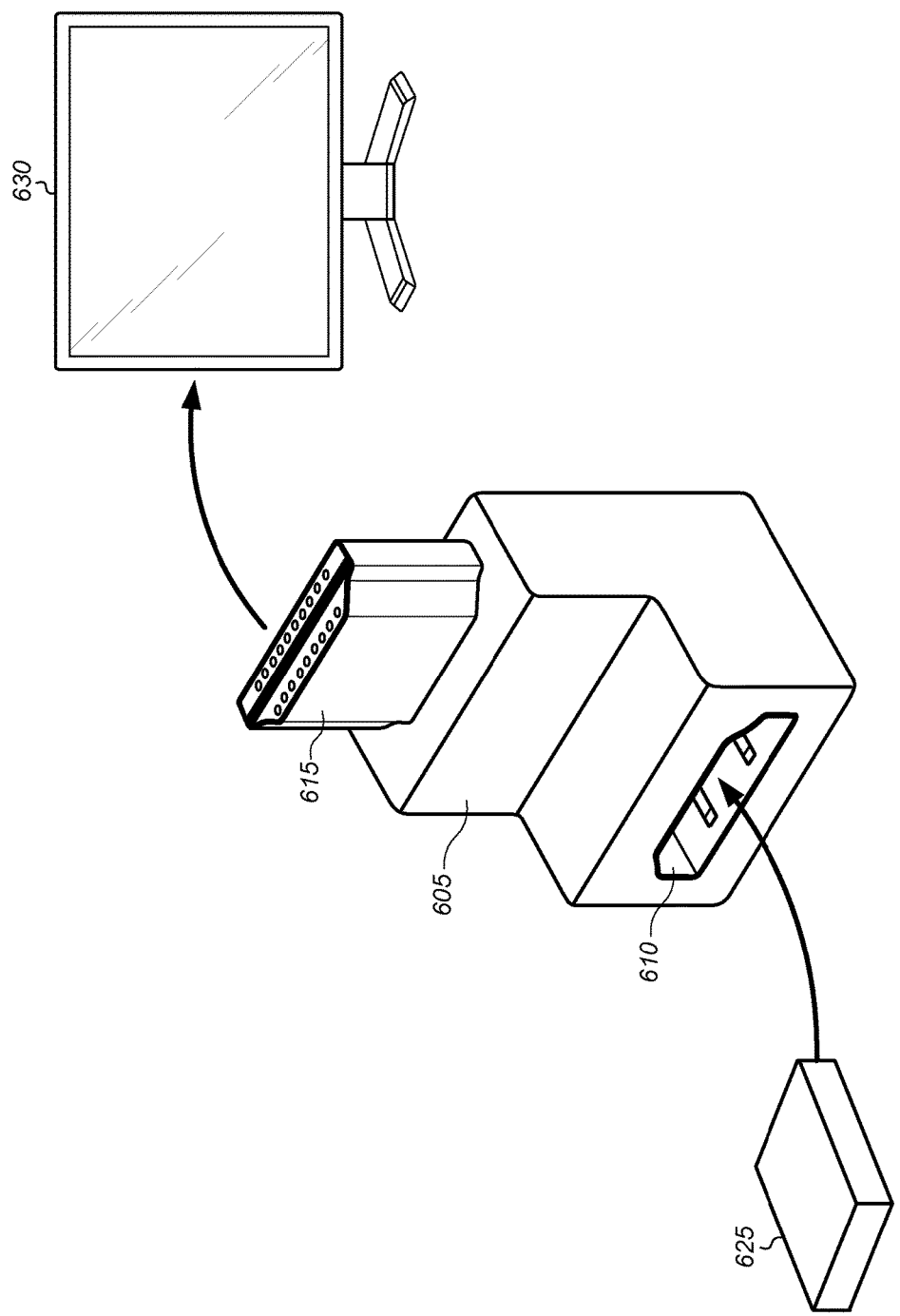
FIG. 6 is a diagram of one embodiment of a display proxy to detect and analyze data being driven to a display.

Turning now to FIG. 6, a diagram of one embodiment of a display proxy 605 to detect and analyze data being driven to a display is shown. Display proxy 605 acts as a proxy to a display 630. In one embodiment, display proxy 605 is a High-Definition Multimedia Interface (HDMI) proxy. In other embodiments, display proxy 605 is compatible with other types of display interfaces. Display proxy 605 may be installed and configured by an administrator, a parent, or other authorized user. In one embodiment, display proxy 605 is installed in between a streaming media player 625 and the display 630. For example, a first HDMI cable can connect streaming media player 625 to female HDMI port 610 of display proxy 605, and then a second HDMI cable can connect male HDMI port 615 to display 630.

The display proxy 605 analyzes, parses, and classifies what is shown on the user main display 630. For example, the display 630 may show files being opened, applications downloaded and started, Uniform Resource Locators (URLs) navigated, what the user is typing on the keyboard, etc. Display proxy 605 includes control logic and/or processing units to process, analyze, parse, and classify the signals being driven to the display 630. In one embodiment, display proxy 605 includes at least a portion of the control logic of smart cover 500 (of FIG. 5).

Display proxy 605 detects various actions by analyzing the signals being driven to the display, and then display proxy 605 determines if any of these actions violate a security policy. In one embodiment, display proxy 605 may control what is displayed on display 630 based on the user who is currently watching display 630. For example, if a child is scrolling through a list of movie titles on display 630, display proxy 605 may block out any titles which are inappropriate for children. The titles would normally appear in a list shown on display 630, but display proxy 605 may remove these titles from the video data that is actually driven to display 630.

Additionally, display proxy 605 may use information crowdsourced from devices running security agents or collected by crawlers to visually identify which of the resources may violate the policy (e.g., how a link leading to a malicious download will look and be positioned on the portal). Once an action that is considered dangerous (e.g., uploading a file containing enterprise secrets to a public share, navigating to a restricted resource, attempting to download known malware) is detected or about to happen, a security policy may be applied. The user may be notified on the main screen by display proxy 605 injecting additional content (e.g., an additional popup).

Figure 7:
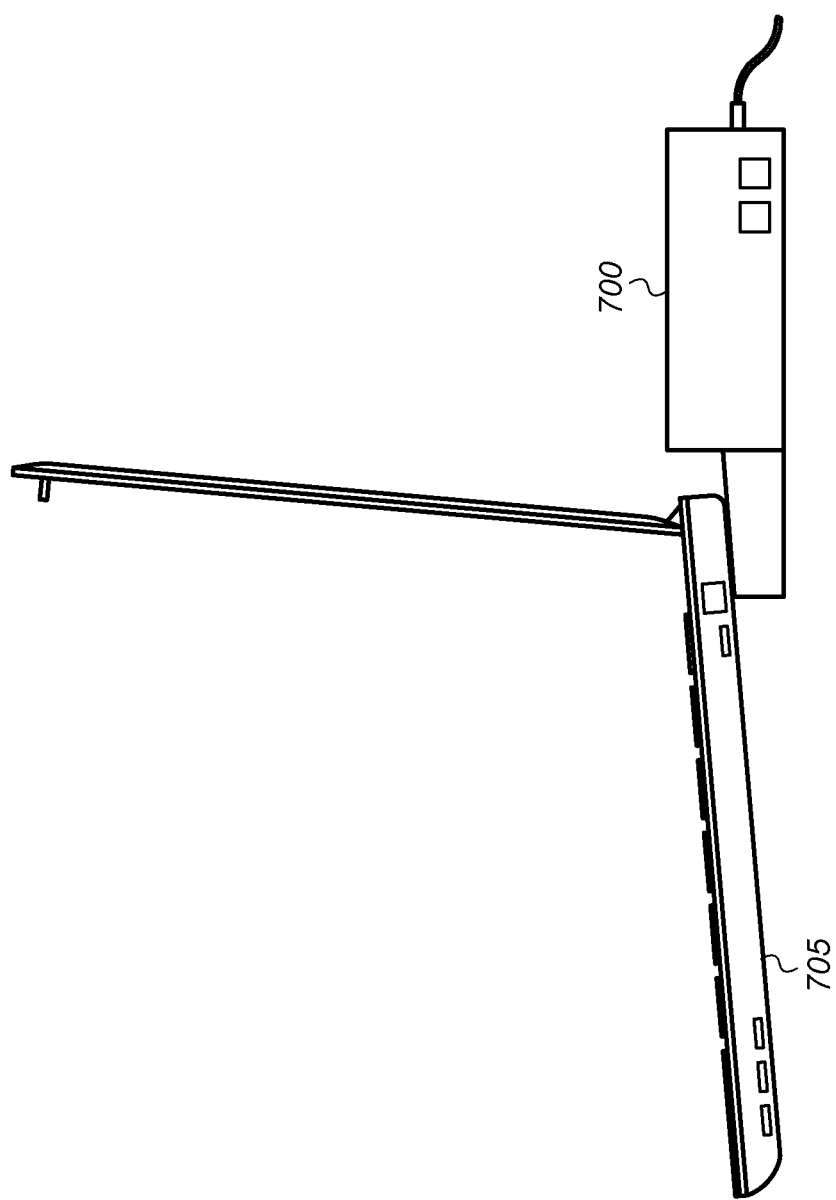
FIG. 7 is a diagram of one embodiment of a docking station acting as a display proxy.

Referring now to FIG. 7, a diagram of one embodiment of a docking station 700 acting as a display proxy is shown. In one embodiment, docking station 700 includes a security device which acts as a display proxy for any laptop 705 which is connected to docking station 700. This display proxy integrated into docking station 700 may include similar functionality to display proxy 605 (of FIG. 6). For example, the display proxy in docking station 700 analyzes, parses, and classifies what is shown on the display of laptop 705. The display proxy analyzes the signals being driven to the display of laptop 705, and then the display proxy determines if any of these signals correspond to actions which violate a security policy. If the display proxy determines that an action violates a security policy, then the display proxy may perform a security action to prevent the suspicious action from being completed.

In one embodiment, the security solution implemented by the display proxy of docking station 700 may be used in combination with traditional software based security enforcement. For example, security software may find it easier to inject a security notification or hide undesired content via a display proxy rather than by modifying a web document object model (DOM) which may lead to the document corruption. The solution may also be used standalone in cases when software security enforcement is either not practical (e.g., protect any laptop that is connected to a smart docking station) or not feasible (e.g., to block purchase flows in a smart television or Blu-Ray® player or hide titles that have been previously categorized as violating policy from a Roku® device).

Figure 8:
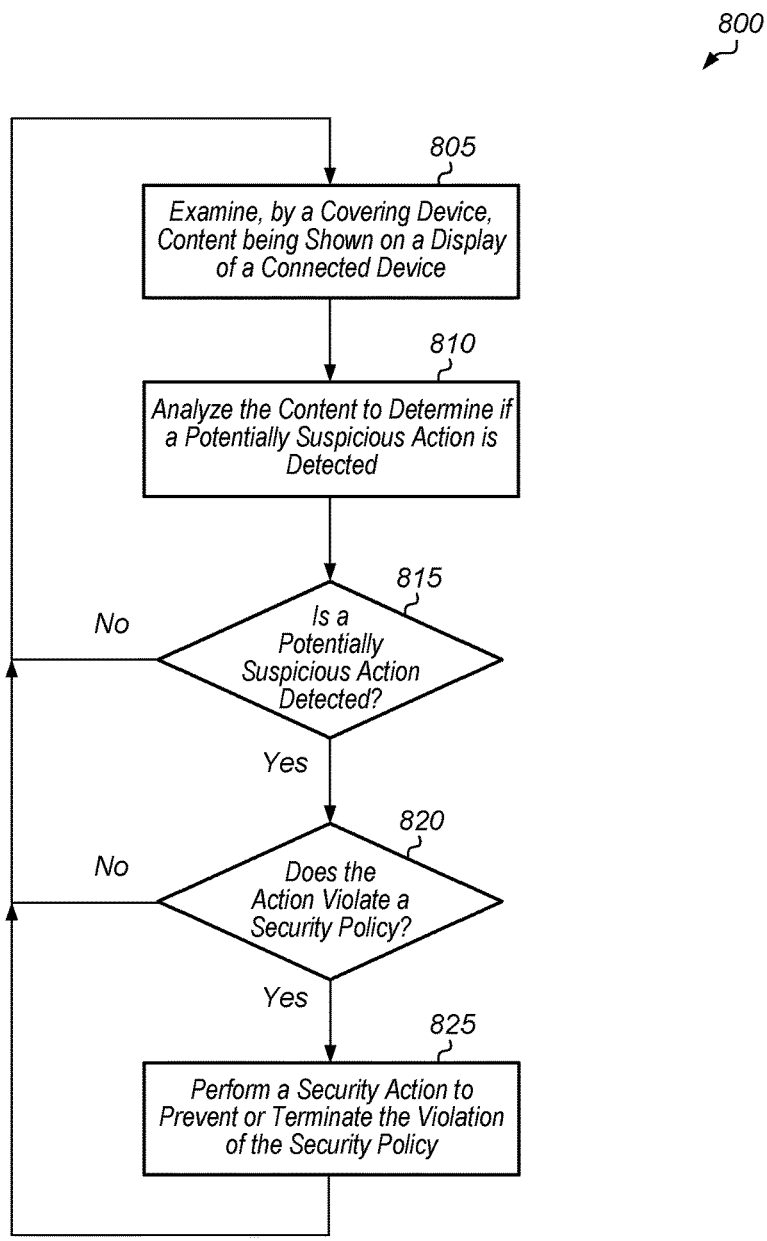
FIG. 8 is a generalized flow diagram illustrating one embodiment of a method for detecting security policy violations on a display.

Turning now to FIG. 8, one embodiment of a method 800 for detecting security policy violations on a display is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 800.

A covering device (e.g., smart cover, security screen protector) examines content being shown on a display of a connected device (block 805). As used herein, the term "covering device" is defined as a device which covers at least a portion of an attached computing device. A "covering device" may be a smart cover, a security screen protector, a smart component, or other type of device. In one embodiment, a security screen protector reads what is on the display using screen reader technology. In another embodiment, a smart cover intercepts the data being driven to the display. For example, if the display is being driven by data on a cable connected to a dock connector, HDMI port, or other connector, the smart cover receives the data on the connector while also allowing the data to pass through to the display. In a further embodiment, the covering device registers as a secondary display of the user device, and then the user device sends the video data to the component with the expectation that the component will display the video data. In other embodiments, other techniques of intercepting, retrieving, or reading the content being shown on the display are possible and are contemplated.

Next, the covering device analyzes the content to determine if a potentially suspicious action is detected (block 810). Depending on the embodiment, various types of actions may be considered as potentially suspicious actions. For example, if a user attempts to navigate to a webpage, if the user attempts to download a file, if the user watches illicit content, if a child attempts to order food for a connected refrigerator, then these may be considered potentially suspicious actions. In some embodiments, the covering device works in combination with a cloud-based service to analyze the content to determine if the content is indicative of malware or unauthorized activity. For example, the covering device may upload the content to the cloud-based service, and then the cloud-based service compares the content to screenshots of displays on other devices previously infected with malware or engaged in unauthorized activity. If the cloud-based service finds a match of the content to a screenshot associated with known malware, the cloud-based service notifies the covering device that a potentially suspicious action has been detected. If a potentially suspicious action is detected (conditional block 815, "yes" leg), then the covering device analyzes the potentially suspicious action to determine if the potentially suspicious action violates a security policy (conditional block 820). If a potentially suspicious action is not detected (conditional block 815, "no" leg), then method 800 returns to block 805.

If the covering device, after analyzing the user action, determines that the potentially suspicious action violates a security policy (conditional block 820, "yes" leg), then the covering device performs a security action to prevent or terminate the violation of the security policy (block 825). For example, in one embodiment, the covering device generates a notification for the user. The notification may be a warning shown on the display, a vibration, a message sent to an administrator, a message sent to an inbox, a change in color of the covering device, an audible sound, or other type of notification. In another embodiment, the covering device prevents the potentially suspicious action from being completed. For example, the covering device can block access to the internet, emulate user actions on a virtual keyboard or mouse to stop the user action, prevent content from being displayed on the screen, overlay content on the screen to block unauthorized content, disable or lock the user device, or utilize other techniques for preventing the user action.

After block 825, method 800 may return to block 805. Alternatively, if the covering device shuts down the device or performs other disruptive actions, then method 800 may end after block 825. If the covering device, after analyzing the potentially suspicious action, determines that the potentially suspicious action does not violate a security policy (conditional block 820, "no" leg), then method 800 returns to block 805.

Figure 9:
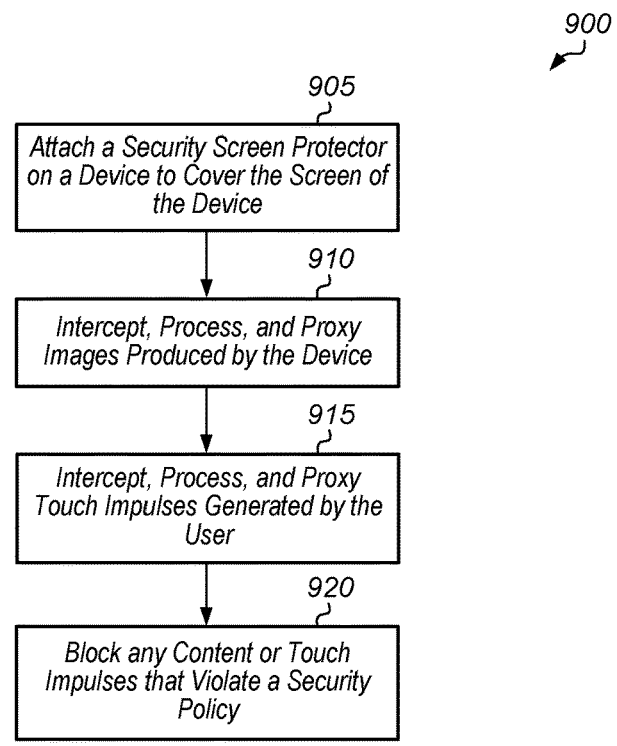
FIG. 9 is a generalized flow diagram illustrating one embodiment of a method for implementing a security screen protector.

Referring now to FIG. 9, one embodiment of a method 900 for implementing a security screen protector is shown. A security screen protector attaches to a device to cover the screen of the device (block 905). The security screen protector is configured to provide an additional layer of security for the device. The security screen protector intercepts, processes, and proxies images produced by the device (block 910). Additionally, the security screen protector intercepts, processes, and proxies touch impulses generated by the user (block 915). The security screen protector blocks any content or touch impulses that violate a security policy (block 920).

For example, if the security screen protector detects inappropriate content being displayed on the screen, the security screen protector can obscure portions of the screen to prevent the user from viewing the inappropriate content. Also, if the user touches on a portion of the screen that would constitute dangerous behavior, such as clicking on a link to a malicious website, the security screen protector does not propagate the user touch through to the touch screen of the device. Other actions may also be taken by the security screen protector to prevent other types of violations of various policies. After block 920, method 900 may end.

Figure 10:
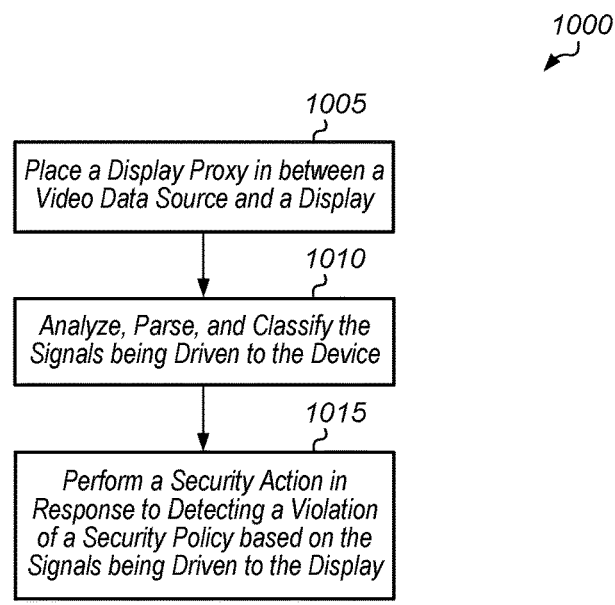
FIG. 10 is a generalized flow diagram illustrating one embodiment of a method for implementing a display proxy.

Turning now to FIG. 10, one embodiment of a method 1000 for implementing a display proxy is shown. A display proxy is placed in between a video data source and a display (block 1005). In one embodiment, the video data source is a streaming media player (e.g., Roku). The display proxy analyzes, parses, and classifies the signals being driven to the display (block 1010). The display proxy performs a security action in response to detecting a violation of a security policy based on the signals being driven to the display (block 1015). Depending on the embodiment, the security action may be blocking a portion of the content being driven to the display, blocking all of the content being driven to the display, generating an alert, sending a warning to an administrator or to a cloud service, and/or other actions. After block 1015, method 1000 ends.

Figure 11:
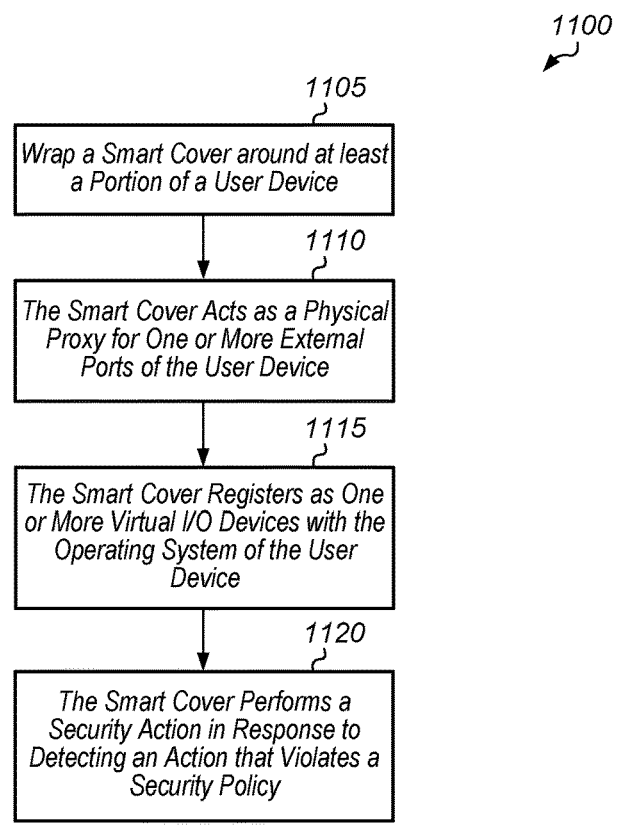
FIG. 11 is a generalized flow diagram illustrating one embodiment of a method for implementing a smart cover.

Referring now to FIG. 11, one embodiment of a method 1100 for implementing a smart cover is shown. A smart cover is wrapped around at least a portion of a user device (block 1105). The smart cover acts as a physical proxy for one or more external ports of the user device (block 1110). The smart cover registers as one or more virtual I/O devices with the operating system of the user device (block 1115). The smart cover performs a security action in response to detecting an action that violates a security policy (block 1120). For example, the smart cover acts as an external keyboard or mouse (either real or virtual) to intercept user input (e.g., what the user is typing) or uses virtual navigation signals from the keyboard or mouse. If the smart cover detects that the user is navigating to a malicious website, the smart cover may generate keystrokes (e.g., to delete the website address from the browser address bar) or mouse clicks (e.g., to close the browser) to prevent the navigation. In other embodiments, the smart cover may perform other actions to prevent the user device from violating a security policy. After block 1120, method 1100 may end.

Figure 12:
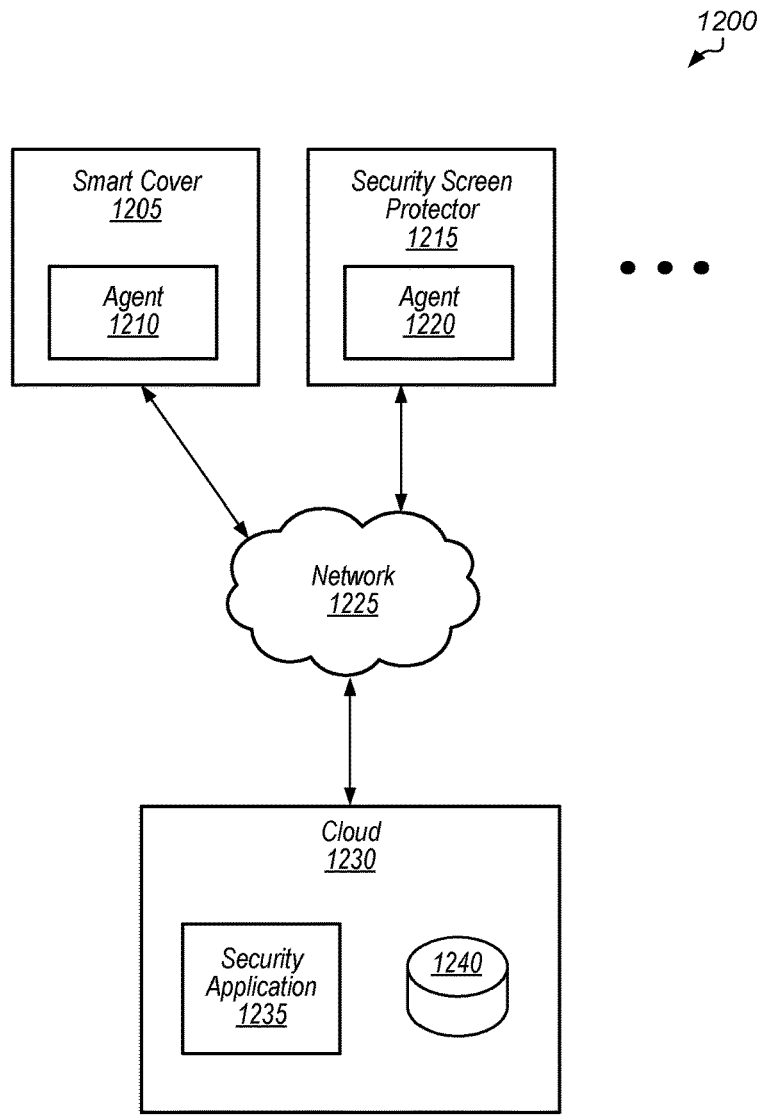
FIG. 12 is a block diagram of one embodiment of a system for utilizing smart components for monitoring connected devices.

Turning now to FIG. 12, a block diagram of one embodiment of a system 1200 for utilizing smart components for monitoring connected devices is shown. In one embodiment, system 1200 includes at least smart cover 1205, security screen protector 1215, network 1225, and cloud 1230. Cloud 1230 is representative of any type of cloud computing environment which is accessible to smart cover 1205, security screen protector 1215, and other clients via network 1215.

Smart cover 1205 is representative of a smart cover which is attached to any type of computing device (e.g., computer, laptop, mobile device). Smart cover 1205 includes agent 1210 for detecting potentially suspicious actions occurring on its attached device. When agent 1210 detects potentially suspicious actions, agent 1210 sends an indication of the action(s) to security application 1235 of cloud 1230. In some embodiments, agent 1210 may send images and/or other data associated with the action(s) to security application 1235 of cloud 1230.

Similarly, security screen protector 1215 is representative of a screen protector which is attached to any type of computing device with a display (e.g., smart thermostat, smart refrigerator, smart appliance, mobile device). Security screen protector 1215 includes agent 1220 for detecting potentially suspicious actions occurring on its attached device. When agent 1220 detects potentially suspicious actions, agent 1220 sends an indication of the action(s) to security application 1235 of cloud 1230. In some embodiments, agent 1220 may send images and/or other data associated with the action(s) to security application 1235 of cloud 1230. Any number of other smart covers, security screen protectors, or other smart components may also provide indications of potentially suspicious actions to security application 1235 of cloud 1230.

In response to receiving indications of potentially suspicious actions, security application 1235 is configured to determine if the action constitutes a violation of a security policy. In some cases, the local agents (e.g., agent 1210, agent 1220) may make an initial determination of whether the action constitutes a violation of a security policy. The local agents may then send an indication of the action to security application 1235 for a more thorough analysis. Security application 1235 is configured to generate a secondary determination of whether the action constitutes a violation of a security policy. Security application 1235 is configured to aggregate information of actions and violations of security policies from large numbers of smart components. For example, in one embodiment, security application 1235 maintains database 1240 of screenshots from other components which experienced security policy violations. If an image from agent 1210 or 1220 matches a screenshot in database 1240, security application 1235 may determine that a security policy is being violated by the corresponding device. After performing an analysis and making a determination, security application 1235 sends results of the analysis and the determination to the local agent. The local agent may then utilize the information from security application 1235 when determining how to respond to the potentially suspicious action(s).

Figure 13:
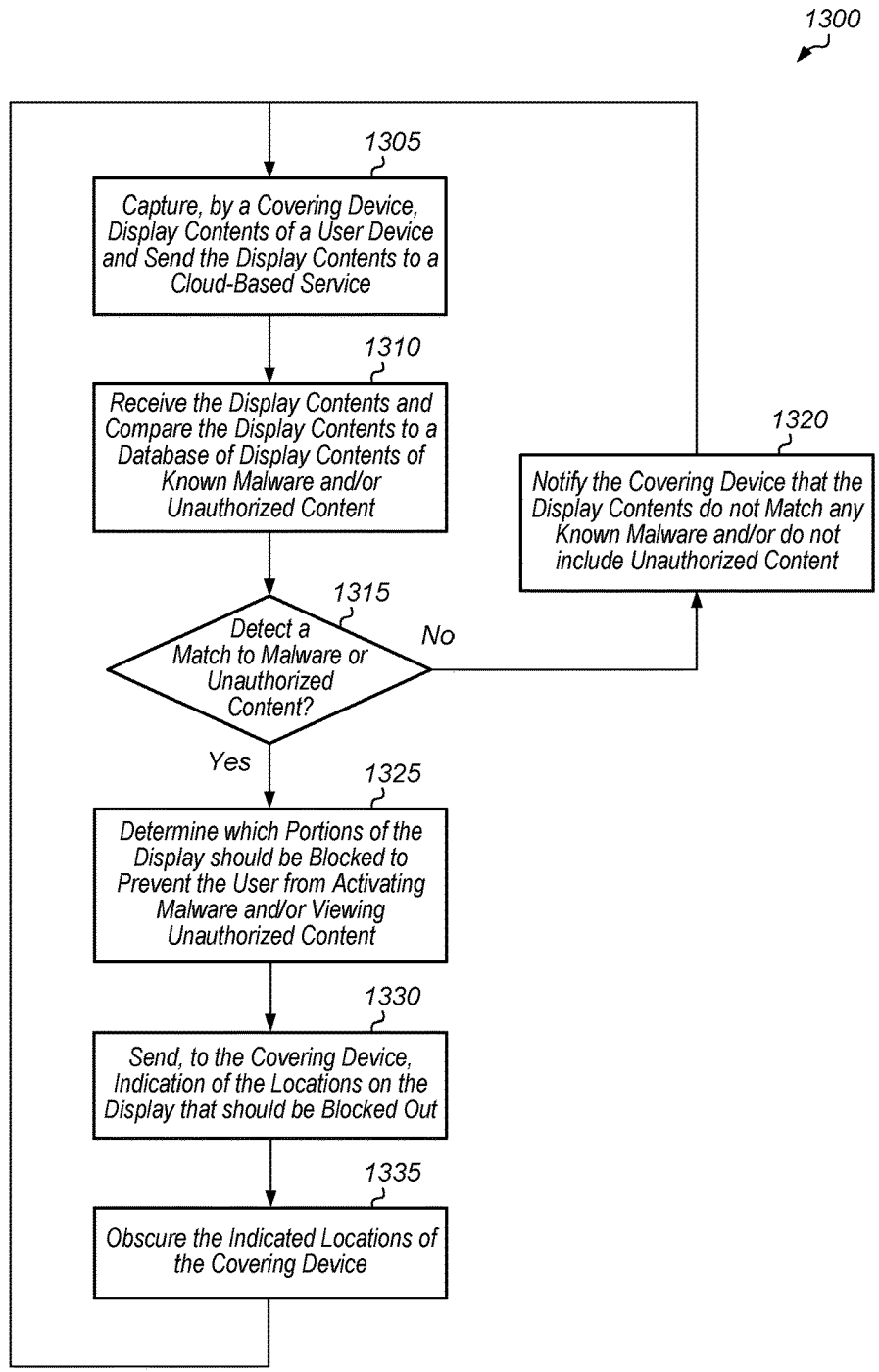
FIG. 13 is a generalized flow diagram illustrating one embodiment of a method for determining if display contents correspond to known malware.

Referring now to FIG. 13, one embodiment of a method 1300 for determining if display contents correspond to known malware is shown. A covering device (e.g., smart cover, security screen protector) captures display contents of a user device and sends the display contents to a cloud-based service (block 1305). In one embodiment, the covering device captures the display contents of the user device using photoresistor technology via a cover (e.g., security screen protector) on top of the display which reads the display on a pixel-by-pixel basis. In another embodiment, the covering device connects to a dock connector of the user device and registers as a secondary display with the operating system of the user device to receive signals for driving a secondary display. In other embodiments, other techniques for retrieving and/or intercepting the display contents are possible and are contemplated.

The cloud-based service receives the display contents and compares the display contents to a database of display contents of known malware and/or unauthorized content (block 1310). In one embodiment, the cloud-based service maintains a database screenshots of the displays of devices that have been infected with malware. If the cloud-based service does not detect a match between the display contents of the user device and any known malware or unauthorized content (conditional block 1315, "no" leg), the cloud-based service notifies the covering device that the display contents do not match any known malware and/or do not include unauthorized content (block 1320), and then method 1300 may return to block 1305.

If the cloud-based service detects a match between the display contents of the user device and any known malware or unauthorized content (conditional block 1315, "yes" leg), then the cloud-based service determines which portions of the display contents should be blocked out to prevent the user from activating malware and/or viewing unauthorized content (block 1325). For example, if the known malware includes a link to a malicious website, then the cloud-based service determines the location of the link on the display. The location of the malicious link may be identified via coordinates to pinpoint the screen location of the malicious link. Next, the cloud-based service sends, to the covering device, indications of the locations on the display that should be blocked out (block 1330). In some embodiments, the cloud-based service also sends a command to the covering device to obscure the film covering over the camera(s) if the display contents match malware which secretly captures video or images from the camera(s) of the user device.

Then, the indicated locations of the covering device are obscured to prevent the user from seeing the malicious links and/or viewing the unauthorized content (block 1335). In one embodiment, the covering device drives a current to the indicated locations of the covering device to obscure the covering device at the indicated locations. Alternatively, in another embodiment, the covering device may prevent the user's touch impulses from propagating through to the touch screen display of the user device for the indicated portions of the display. After block 1335, method 1300 may return to block 1305 as the display contents of the user device change.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a computing device, wherein the computing device comprises a display; and
a covering device, wherein the covering device covers at least a portion of the computing device;
wherein the covering device is configured to:
examine contents being shown on the display of the computing device;
analyze the contents to determine if a security policy is being violated; and
obscure at least a portion of the covering device to block the contents of at least a portion of the display, responsive to determining that the security policy is being violated.

2. The system as recited in claim 1, wherein the covering device is configured to:
send the contents of the display to a cloud-based service;
receive, from the cloud-based service, a determination that the security policy is being violated; and
receive, from the cloud-based service, an indication of which portions of the covering device to obscure.

3. The system as recited in claim 2, wherein the cloud-based service is configured to:
compare the contents of the display to a database of known malware;
generate an indication that the security policy is being violated responsive to detecting a match between the contents of the display and a display associated with known malware;
send, to the covering device, the indication that the security policy is being violated; and
send, to the covering device, an indication of which portions of the covering device to obscure.

4. The system as recited in claim 1, wherein the portion of the covering device which is obscured corresponds to a link to a malicious website.

5. The system as recited in claim 1, wherein the covering device covers the display of the computing device, and wherein the covering device is configured to utilize photoresistor technology to read the display of the computing device on a pixel-by-pixel basis.

6. The system as recited in claim 1, wherein the covering device includes a layer of smart film technology to obscure the portion of the display of the computing device responsive to determining contents being displayed on the portion of the display violate the security policy.

7. The system as recited in claim 1, wherein the covering device is configured to perform one or more security actions in addition to obscuring at least the portion of the covering device responsive to determining that the security policy is being violated.

8. A method comprising:
using a covering device to cover at least a portion of a computing device;
using the covering device to examine contents being shown on a display of a computing device;
using the covering device to analyze the contents to determine if a security policy is being violated; and
obscuring at least a portion of the covering device to block the contents of at least a portion of the display, responsive to determining that the security policy is being violated.

9. The method as recited in claim 8, further comprising:
sending the contents of the display to a cloud-based service;
receiving, from the cloud-based service, a determination that the security policy is being violated; and
receiving, from the cloud-based service, an indication of which portions of the covering device to obscure.

10. The method as recited in claim 9, further comprising:
comparing the contents of the display to a database of known malware;
generating an indication that the security policy is being violated responsive to detecting a match between the contents of the display and a display associated with known malware;
sending, to the covering device, the indication that the security policy is being violated; and
sending, to the covering device, an indication of which portions of the covering device to obscure.

11. The method as recited in claim 8, wherein the portion of the covering device which is obscured corresponds to a link to a malicious website.

12. The method as recited in claim 8, wherein the covering device covers the display of the computing device, and wherein the method further comprising utilizing photoresistor technology to read the display of the computing device on a pixel-by-pixel basis.

13. The method as recited in claim 8, further comprising utilizing a layer of smart film technology to obscure the portion of the display of the computing device responsive to determining contents being displayed on the portion of the display violate the security policy.

14. The method as recited in claim 8, further comprising performing one or more security actions in addition to obscuring at least the portion of the covering device responsive to determining that the security policy is being violated.

15. A covering device comprising:
one or more processors; and
one or more input/output (I/O) interfaces;
wherein the covering device is configured to:
cover at least a portion of a computing device;
examine contents being shown on a display of the computing device;
analyze the contents to determine if a security policy is being violated; and
obscure at least a portion of the covering device to block the contents of at least a portion of the display, responsive to determining that the security policy is being violated.

16. The covering device as recited in claim 15, wherein the covering device is further configured to:
send the contents of the display to a cloud-based service;
receive, from the cloud-based service, a determination that the security policy is being violated; and
receive, from the cloud-based service, an indication of which portions of the covering device to obscure.

17. The covering device as recited in claim 16, wherein the covering device is further configured to cause the contents of the display to be compared to a database of known malware.

18. The covering device as recited in claim 15, wherein the portion of the covering device which is obscured corresponds to a link to a malicious website.

19. The covering device as recited in claim 15, wherein the covering device covers the display of the computing device, and wherein the covering device is configured to utilize photoresistor technology to read the display of the computing device on a pixel-by-pixel basis.

20. The covering device as recited in claim 15, wherein the covering device includes a layer of smart film technology to obscure the portion of the display of the computing device responsive to determining contents being displayed on the portion of the display violate the security policy.

* * * * *